United States Patent
Long

[11] 3,751,162
[45] Aug. 7, 1973

[54] REFRACTOMETER AND REFLECTOMETER

[76] Inventor: Richard H. Long, 1428 E. Park St., Grants Pass, Oreg. 97526

[22] Filed: Mar. 13, 1972

[21] Appl. No.: 234,025

[52] U.S. Cl. ............... 356/30, 356/128, 356/209, 356/212
[51] Int. Cl. ............................................ G01n 21/48
[58] Field of Search ............... 356/30, 128, 209, 356/212

[56] References Cited
UNITED STATES PATENTS

| | | | |
|---|---|---|---|
| 3,610,756 | 10/1971 | Lenzen | 356/30 |
| 2,215,211 | 9/1940 | Devol | 356/212 X |
| 3,483,385 | 12/1969 | Heaslip et al. | 356/212 X |
| 3,572,951 | 3/1971 | Rothwarf | 356/212 |
| 2,960,909 | 11/1960 | Shipley, Jr. | 356/30 |

*Primary Examiner*—David Schonberg
*Assistant Examiner*—F. L. Evans
*Attorney*—Clarence M. Crews

[57] ABSTRACT

An instrument is provided, primarily as a refractometer, and which has the unique capability of distinguishing and identifying finished gems and gem materials by their refractive index and/or ratio of reflected light to projected light, and for exposing spurious imitations. For gem stone analyzing purposes the instrument is based on the Fresnel formula, which requires a flat highly polished surface, the formula reading $$n = (r - 1)^2/(r + 1)^2$$

where $n$ is the ratio of reflected light to projected light at normal incidence, and $r$ is the index of refraction of the specimen being tested. If r and n are plotted as abscissas and ordinates, respectively, the resulting curve is almost linear in the crucial range between $r = 1.5$ and $r = 3$, with slopes of 0.128 and 0.125, for the respective stated values of r. An electronic system is devised in which the read-out is proportional to n, and is substantially proportional to $r$ throughout the range of interest. The light is necessarily projected upon a flat facet of the specimen a little off normal incidence, but this has little effect upon the read-out.

5 Claims, 6 Drawing Figures

INVENTOR:
RICHARD H. LONG
HIS ATTORNEY

INVENTOR:
RICHARD H. LONG
by: Clarence M. Crews
HIS ATTORNEY

REFRACTOMETER AND REFLECTOMETER

This invention relates to refractometers and is primarily intended for identifying and determining the genuineness of jewels such as diamonds, rubies, sapphires, etc. and for differentiating them from, and detecting, imitations thereof.

Every transparent solid has a definite index of refraction by which it may be identified. For precious jewels th index of refraction is located at various points between the limits 1.5 and 3.0. The determination of the index of refraction assists in either identifying gems and gem materials or exposing spurious imitations.

The present invention is designed to take advantage of Fresnel's formula which is $$n = (r-1)^2/(r+1)^2$$

where $n$ is the ratio of reflected light to projected light at normal incidence, and r is the index of refraction of the test specimen.

Broadly, the present invention involves the contrivance of an electronic instrument in which the ratio of reflected light to projected light is the normal measure of output, but this is translated into refractive index as a read-out.

It is an interesting and useful fact that this ratio or percentage n bears an almost linear relation to the index of refraction between a lower value of the index of refraction of 1.5 and an upper value 0f 3.0, the range which comprehends all gem stones. When the index of refraction is 1.5, the slope of the curve is 0.128, and when the index of refraction is 3.0 the slope of the curve is 0.125. The slope of the curve for all intermediate values of r does not deviate importantly from linearity. If, therefore, a read-out instrument is provided in which the movable member moves in direct proportion to variations of $n$, it can be graduated for increments or r on an almost linear scale. If the scale is graduated in terms of r, the scale can be an open, substantially linear, uncrowded scale throughout the range of interest.

One type of instrument using uacuum tubes is shown in the drawing forming part of this specification, in which FIG. 1 is a plan view of a test instrument which forms a significant part of a total index of refraction indicating system;

Figure 1:
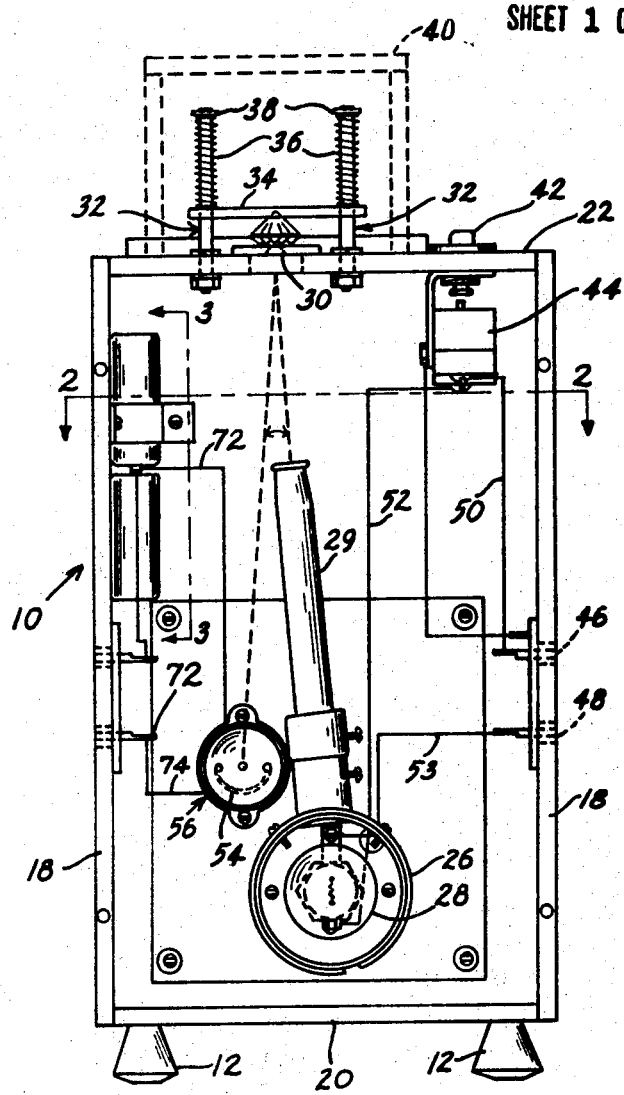
Figure 3:
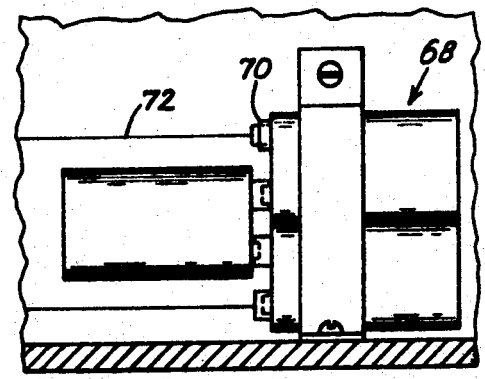
FIG. 3 is a fragmentary, sectional view, taken on the line 3—3 of FIG. 1, looking in the direction of the arrows.
Figure 6:
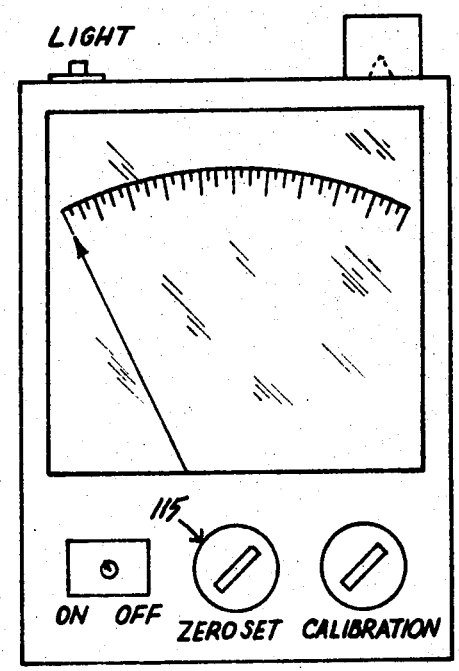
FIG. 6 is a face view of a box or housing which forms part of the instrument.
Figure 2:
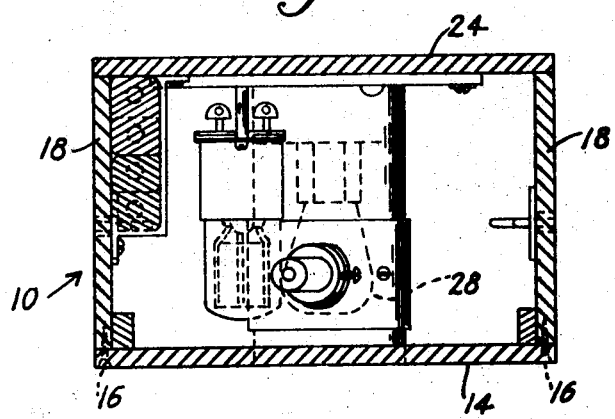
FIG. 2 is a sectional view, taken on the line 2—2 of FIG. 1, looking in the direction of the arrows.
Figures 4, 5:
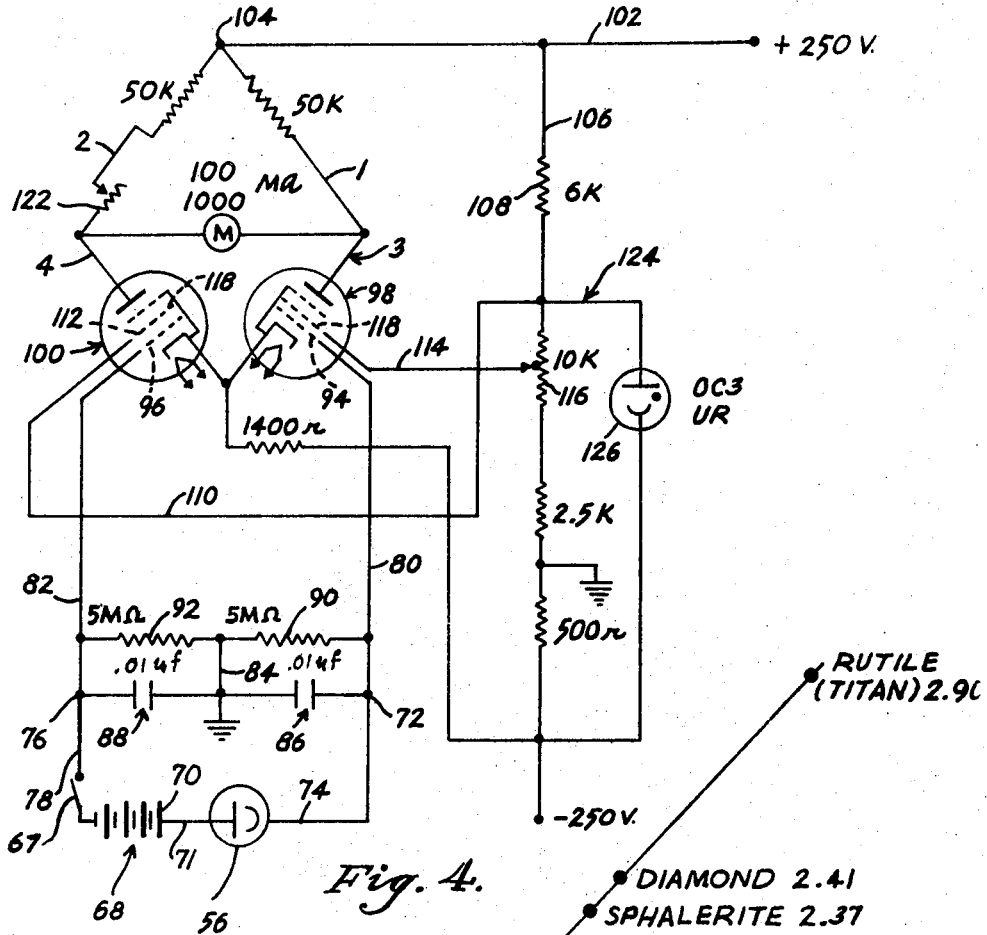
FIG. 4 is a diagrammatic view of the complete circuitry of the system.
FIG. 5 is a graph showing indexes of refraction as abscissas and corresponding ratios of reflected light to incident light as ordinates.

The testing system in its entirety includes a lighttight box 10 having suction rubber feet 12. The box is shown in FIG. 1 with the cover 14 removed. The cover 14 is normally secured by screws 16 to the sides 18, the bottom 20 and the top 22 of the box. The enclosure is completed by a vertical wall 24 which is located opposite to the cover. The interior of the box, and everything inside it, is desirably painted a dull black for holding reflection of light to a minimum.

A light-tight cylindrical casing 26 houses an electric light 28, the only outlet being through a tube 29 in which a suitable optical condensing system is provided for transmitting the light in parallel rays through a small aperture in a target plate 30 fastened to the top wall 22 of the box.

Any specimen to be tested must have a flat, highly polished face of sufficient area to cover the outer end of the aperture in the target plate 30. Suitable means is provided for holding the specimen securely, but removably, in place over the aperture on the target plate. Such means desirably includes a pair of parallel pins 32 affixed exteriorly to the wall 22 and extending upward therefrom. A pressure plate 34, impaled upon both pins, but freely movable relative to them, is urged toward the target plate 30 by two compression coil springs 36 which surround the respective pins. The pins may be formed with heads 38 which serve as abutments for the outer ends of the respective springs.

The test specimen is put in place by withdrawing the plate 34 against the resistance of the springs 36, setting the test specimen over the aperture in the target plate 30, and gently releasing the pressure plate to perform its intended function of holding the specimen in place. A light-tight cap 40 is then placed on the top wall 22 in position to enclose the specimen and the means for holding it in place, in complete darkness.

When the specimen has been secured in place, a switch button 42 is pressed to close a normally open switch 44. A constant voltage source of electrical energy, plugged in at 46,48 is thereby activated to energize the light 28. The circuit may be traced from 46 through conductor 50 to a terminal of switch 44, thence through a conductor 52 to a terminal of the light 28, and finally from 28 through conductor 53 to 48. This circuit just described is independent of any other circuit and care is taken to assure that it will deliver a definite and constant voltage. This is very important because the intensity of the light produced depends upon this voltage, and it is a percentage of the light so produced which controls the read-out of the system.

It is not feasible to cause the light to be projected precisely at right angles to the face of the specimen being tested, because the reflected light must be utilized. The angle of incidence is offset from normal, therefore, to the least extent practicable, say by approximately 5°, so that the angle of divergence of the projected light and the reflected light will be only approximately ten degrees.

The reflected light all impinges upon the sensitive collector 54 of a photo-sensitive cell 56. The resistance of the photo-sensitive cell decreases with the intensity of light striking its target. The decreased resistance can be used, through suitable amplifiers, to produce a read-out that reveals with great precision the refractive index of the test specimen.

The photo-sensitive cell is included in a normally open circuit which includes a switch 67, and a battery 68 whose positive terminal 70 is connected through a conductor 71 to the photo-sensitive cell 56. The photo-sensitive cell 56 is connected to a grid 94 of a pentode 98 through a conductor 74. A grid 96 of pentode 100 is connected through a conductor 78 to the negative terminal of battery 68.

Exteriorly of the box, the terminals 72 and 76 are connected, respectively, to conductors 80 and 82. The conductors 80 and 82 are connected to a common conductor 84 and thence to ground through capacitors 86 and 88 and through resistors 90 and 92. The conductors 80 and 82 terminate in control grids 94 and 96 of the pentodes 98 and 100.

A 250 volt source of d. c. electrical potential is furnished through a conductor 102 to one terminal 104 of a wheatstone bridge having arms 1, 2, 3 and 4, the pentodes 98 and 100 being interposed, respectively, in arms 3 and 4 of the bridge.

A branch conductor 106 which includes a fixed resistor 108 is connected through a conductor 110 to the screen grid 112 of pentode 100, while a branch conductor 114 which takes off from a variable resistor 116 is connected to screen grid 118 of pentode 98.

A branch circuit 124 includes a gaseous voltage regulator tube 126, illustratively an OB2WA, which has a voltage drop of 105 volts regardless of the load through it. By its use a constant voltage is assured, regardless of fluctuations in the line voltage.

The arm 2 of the wheatstone bridge includes a fine adjusting variable resistor 122 which may be set to make the resistance of arm 2 precisely equal to that of arm 1.

When this has been established, without any specimen in place and without the light turned on, but with the battery 68 energized, the wheatstone bridge is brought precisely into balance by adjustment, through a knob 115, of variable resistor 116 as a coarse adjustment and 120 as a fine adjustment. When a specimen is thereafter put in position for testing, the resistance of photo-cell 56 is altered in an amount which varies with the intensity of the reflected light. In consequence, a meter M bridged across the wheatstone bridge will measure and reveal the current flow through the meter. The current flow through the meter will be directly proportional to the percentage of reflected light, and hence will be nearly proportional to the index of refraction of the test specimen, if the specimen lies within the range between an index of refraction of 1.5 and an index of refraction of 3.0. It is a simple matter to graduate the meter in terms of index of refraction and the scale will be an almost linear scale.

For the practical graduation of the meter, it is entirely practical to test two specimens having substantially different, known indexes of refraction within the range of interest and, on the basis of those two markings alone to work out the scale markings for the instrument.

The same instrument, or an instrument the same in general structure and principle, can be used for measuring and indicating the reflectivity of paint. In such an instrument, however, a different range might be of primary interest, and different scale markings would desirably be used.

While the illustrative machine employs vacuum tubes the functions of the circuits can obviously be realized with solid state devices.

I have shown and described what I believe to be the best embodiment of my invention. What I desire to secure by letters patent is set forth in the appended claims.

1. An instrument for revealing the index of refraction of purported gem stones, as a means for indicating whether or not they are as represented, comprising, in combination,
   a. means for producing and projecting light of controlled, fixed intensity upon a flat surface of fixed predetermined area of a face of the purported gem stone at an angle near the normal,
   b. an electric circuit including an electromotive source of fixed voltage and a light sensitive element so disposed that all the light reflected from such face of the purported gem stone is caused to impinge upon it, so that the resistance of the element (positive or negative) varies with the intensity of the reflected light, and
   c. means for comparing the voltage from said source of fixed voltage as affected by an arbitrary resistance with voltage from the same source as affected by the variable resistance produced by the light sensitive element, to produce a read-out proportional to the ratio of reflected light to projected light, which in the case of gem stones according to the Fresnel formula, is interpreted in terms of refractive index on a consistently open scale, throughout the gem stone range of refractive indexes.

2. An instrument as set forth in claim 1 which includes means for shielding the purported gem stone against exposure to all light except that provided by the aforesaid light producing means, and for shielding the light sensitive element against exposure to all light other than that reflected by the test specimen.

3. An instrument as set forth in claim 2 in which the light sensitive element is a photo-electric cell.

4. An instrument as set forth in claim 2 in which the light sensitive element is a solar cell.

5. An instrument as set forth in claim 2 in which the comparing means includes a wheatstone bridge having two legs of set resistance, a third leg including an electronic tube of fixed bias, a fourth including an electronic tube whose bias is affected by the resistance of the photo-sensitive element as modified by the light reflected by the purported gem stone, and a bridging read-out instrumentality responsive to imbalance of the third and fourth legs of the wheatstone bridge.

* * * * *